Patented Aug. 11, 1936

2,050,979

UNITED STATES PATENT OFFICE 2,050,979

METHOD OF HALOGENATING COMPOUNDS CONTAINING AN ABIETYL GROUP AND PRODUCT THEREOF

Joseph N. Borglin, Wilmington, Del., assignor to Hercules Powder Company, Wilmington, Del., a corporation of Delaware No Drawing. Application February 23, 1935, Serial No. 7,845

24 Claims. (Cl. 260—99.40)

This invention relates to method for halogenating compounds containing an abietyl group and product thereof.

The method in accordance with this invention is applicable generally to compounds containing an abietyl group or, in other words, to compounds containing the nucleus of abietic acid, as, for example, the abietic acid molecule without the COOH group, or, for example, the corresponding molecule of abietyl alcohol without the CH₂OH group.

Thus, the method in accordance with this invention will be applicable to compounds containing an abietyl group, such as rosin, rosin esters, abietyl alcohol, esters of abietyl alcohol, etc. Further, the method in accordance with this invention will be applicable to compounds containing an abietyl group the saturation of which has been reduced by hydrogen.

Further, the method in accordance with this invention will be applicable with the use of the various halogens, as chlorine, bromine, iodine, fluorine, etc.

Heretofore it has been known to halogenate rosin. Thus, for example, the chlorination of rosin in solution in various solvents, such as carbon tetrachloride, has been known. It has not heretofore been known to halogenate compounds containing the abietyl group other than rosin.

The chlorinated rosin product of the prior art was of little value in that it was relatively unstable. Further, it has not been heretofore known to effect halogenation of compounds containing the abietyl group with halogens other than chlorine.

Now in accordance with this invention a method for the halogenation of compounds containing an abietyl group is provided whereby a stable product containing a high percentage of halogen may be produced.

The method in accordance with this invention broadly comprises the halogenation of a compound containing an abietyl group in the presence of a catalyst, more specifically, a halogenated compound containing an abietyl group is treated with a catalyst. During the catalytic treatment, treatment with a halogen will desirably though not necessarily be continued whether or not the compound is desirably halogenated prior to treatment with a catalyst.

More particularly, the method in accordance with this invention comprises treatment of a compound containing an abietyl group in solution in a suitable solvent with a halogen at an elevated temperature with or without a catalyst throughout or during part of the halogenation and in carrying out the treatment of the completely halogenated compound with a catalyst at an elevated temperature.

In the practical adaptation of the method in accordance with this invention, as has been indicated, rosin, heat treated rosin, hydrogenated rosin, abietic acid, rosin esters, as methyl, ethyl, propyl, butyl, glycol and glycerol abietates, abietyl alcohol, hydrogenated abietyl alcohol and esters thereof, may be halogenated by treatment with a halogen, such as chlorine, bromine, iodine and fluorine. As the catalyst, for example, metal halides may be used, such, for example, as aluminum chloride, stannic chloride, zinc chloride, ferric chloride, etc. The compound containing an abietyl group may, if desired, be refined before halogenation, as by treatment with a selective solvent, an absorbent, as fuller's earth, by crystallization, etc. Where a metal halide is used as the catalyst, it will desirably be anhydrous. If desired, the catalyst may be formed in situ with use of a metal, as aluminum, tin, zinc, iron, etc., which will react with hydrogen halide, evolved in the halogenation for the formation of a metal halide. As solvents for the compound containing an abietyl group, for example, carbon tetrachloride, ethylene dichloride, methanol, and the like, will be found satisfactory. The solvent will desirably be inert to the halogen; however, where a solvent is used which will be acted upon by halogen under certain conditions, action by the halogen upon the solvent can often be avoided by excluding light during the reaction.

The halogenation and catalytic treatment will be desirably carried out at an elevated temperature, as, for example, at a temperature within the range about 50° C. to about 125° C., though it will be appreciated that the particular temperature will be a detail rather than of the essence of this invention.

In proceeding, the compound containing an abietyl group may be halogenated by passing a halogen in gaseous form through a solution of the compound or by the addition of a halogen to the solution in the presence of a catalyst. Variously, the halogenation may be carried out under reflux and, as has been indicated, the halogenation may be brought to completion and the halogenated product subjected to catalytic treatment, or the catalyst may be added to the reaction mass before starting the halogenation, or during the halogenation, or when the halogenation is complete. Treatment at an elevated temperature with a catalyst after partial or complete halogenation will be preferred.

The halogenated product embodying this invention and produced in accordance with the method of this invention will be found to be of a highly stable character in distinction from products produced without catalytic treatment.

The product in accordance with this invention may be recovered from the reaction mixture by any suitable method, such as precipitation with water, evaporation off of the solvent, extraction of the solvent, or other suitable procedure, and the solution, before recovery of the product, may be washed with a dilute alkali solution as a soda ash, soda bicarbonate, ammonia or the like solution, to remove halogen acid.

The method in accordance with this invention may be carried out without the use of any special apparatus, it being only necessary to provide a suitable vessel for holding a solution of compound containing an abietyl group, which is provided with means for heating and means for the introduction of a halogen in gaseous form, where such is used. Desirably, apparatus enabling refluxing will be used. The method may be carried out as a batch method, or variously as a continuous method, it being noted that with the use of certain solvents, as, for example, methanol, and the like, the halogenated products are less miscible with the solvent than the original unhalogenated compound. As a result, if an excess of solvent be avoided, the halogenated product will precipitate and may be continuously removed from the solvent as formed, with the corresponding addition of a compound to be halogenated.

As illustrative of the practical adaptation of the method in accordance with this invention for the production of the product thereof, for example, to a 20% solution of wood rosin, grading I in color, in anhydrous methanol, there is added 3% of metallic aluminum, desirably in the form of powder. The solution is refluxed in a suitable vessel while passing a stream of chlorine through the solution. Chlorine will rapidly add to the unsaturation of the abietyl group of the rosin and the reaction will soon be complete as far as addition is concerned. During the reaction there will be some substitution and hydrogen halide, as hydrochloric acid, will split off. The hydrochloric acid split off will react with the metallic aluminum for the formation of aluminum chloride. The refluxing is continued after the completion of the addition of chlorine to the abietyl group and in the presence of the aluminum chloride formed as indicated. In the example given the treatment will continue over a period of several hours.

In the early stages of the treatment the chlorine will add to the unsaturation of the abietyl group and during the latter stages the chlorinated rosin will be subjected to catalytic treatment in the presence of the aluminum chloride formed as the result of the reaction of hydrochloric acid split off with the metallic aluminum originally added to the solution. During the catalytic treatment the passage of chlorine through the solution may, and desirably will, be continued. On completion of the treatment, the product is recovered after filtration of the solution by dilution of the solution with water, which will result in precipitation of the product.

The product obtained in accordance with the above example will, on analysis, show a chlorine content of about 25.7% chlorine and will be highly stable, as indicated by the fact that on heating at 105° C. for four hours, the product will still contain about 25.7% chlorine.

Rechlorination of the product obtained as above will result in a product containing about 29.3% chlorine, which will be highly stable, as evidenced by the fact that its chlorine content will not change on heating for four hours at 105° C.

In the above procedure, if desired, a metallic halide, as aluminum chloride, may be added to the solution after substantial addition of chlorine to the rosin has occurred or after complete addition of chlorine and heating of the chlorinated product in the presence of the aluminum chloride continued. With such procedure following the above example, a chlorinated product containing about 30% of chlorine will be obtained and the product will be of high stability.

In comparison with the product obtained as described above, a chlorinated product may be obtained by the chlorination of the same rosin without the use of a catalyst as described, which will contain 40% or more of chlorine. However, such product will be of low stability, as indicated by the fact that on heating for four hours at 105° C. from 10%–40% of the chlorine will be lost.

As further illustrative of the practical adaptation of this invention for the chlorination of wood rosin grading I in color, for example, the above procedure may be followed using a 5% solution of wood rosin, grading I in color, in methanol, with the addition of 1% of aluminum powder and chlorinating for seven hours at refluxing temperature. The resultant product recovered after filtration of the solution by precipitation from the solution with water will analyze about 28.6% chlorine and when heated for four hours at 105° C. will show no loss of chlorine.

As further illustrative, for example, 25 parts by weight of wood rosin, grading I in color, dissolved in 500 parts by weight of methanol and having 0.75 parts by weight of aluminum powder added, are subjected to treatment with chlorine for seven hours at refluxing temperature. After treatment the solution is filtered for the removal of insoluble product, it being noted that chlorinated rosin is soluble in methanol only to about 2%. The insoluble product is dissolved in a small amount of acetone and the filtered solution divided into two equal parts. One of the parts is extracted three times with a low boiling petroleum hydrocarbon and the combined hydrocarbon solutions evaporated under reduced pressure. 10.5 parts of chlorinated rosin are recovered, which analyze 20.6% chlorine and show the same chlorine content after heating for four hours at 105° C.

The petroleum hydrocarbon extracted solution is then diluted with water to precipitate any residual chlorinated rosin. As a result 1.5 parts by weight of chlorinated rosin is recovered, which analyze 23.9% chlorine. Thus, 88% of the chlorinated rosin is recovered by petroleum hydrocarbon extraction.

The second portion of the methanol solution of chlorinated rosin was diluted with water and the precipitated chlorinated rosin dried. As a result 12 parts by weight of chlorinated rosin were recovered, which analyzed 20.7% chlorine and after heating for four hours at 105° C. still analyzed 20.7% chlorine. Thus, it will be noted that a product of the same type and stability can be recovered from solution either by precipitation or by extraction.

As further illustrative, for example, 20 parts by weight of methyl abietate, 20 parts by weight of methanol and 0.5 parts by weight of aluminum powder were chlorinated for seven hours at a temperature of about 80° C. The chlorinated methyl abietate was recovered from the solution by precipitation with water and dried. This product analyzed 22.3% chlorine and after heating for four hours at 105° C. analyzed 21.7% chlorine.

As further illustrative, for example, 25 parts by weight of wood rosin, grading I in color, dissolved in 50 parts by weight of ethylene dichloride were chlorinated for three hours at refluxing temperature. Then a solution comprising three parts of aluminum chloride in 100 parts by weight of ethylene dichloride was added to the rosin solution slowly with continuation of the chlorination and the treatment continued for a further period of four hours, making a total treating period of seven hours. The treated solution was then water washed and the solvent evaporated under reduced pressure. The product obtained analyzed 40.7% chlorine and after heating four hours at 105° C. analyzed 40.0% chlorine.

As further illustrative, to a solution comprising 50 grams of wood rosin, grading I in color, in 100 grams of ethylene dichloride, is added 20 grams of bromine in solution in 100 grams of ethylene dichloride and the resultant solution refluxed for four hours, cooled and a solution comprising 2 grams of aluminum chloride and 20 grams of bromine in 60 grams of ethylene dichloride added. The resulting solution was then refluxed for four hours, cooled, water-washed, decanted, filtered and the solvent evaporated. The product analyzed 16% bromine.

Following the same procedure using iodine in place of bromine, a product analyzing 9.4% iodine was obtained.

As further illustrative, for example, to a solution of 50 grams of dihydroabietyl alcohol dissolved in 50 grams of ethylene dichloride, 0.5 grams of aluminum chloride in solution in 30 grams of ethylene dichloride are added. The resulting solution is chlorinated four hours at a refluxing temperature, cooled and a solution comprising two grams of aluminum chloride in 50 grams of ethylene dichloride added. The chlorination is then continued for four additional hours at refluxing temperature, the solution cooled, water-washed, decanted, filtered and evaporated. The product will analyze 42.6% chlorine.

As further illustrative, 25 grams of hydrogenated abietyl alcohol, 50 grams of ethylene dichloride and 5 grams of bromine are refluxed for four hours and after refluxing for four hours and cooling 1 gram of aluminum chloride and 5 grams of bromine in solution in 30 grams of ethylene dichloride are added and the refluxing continued for an additional hour hours. The solution is then water-washed with an aqueous solution of sodium thiosulphate, again water-washed and the solvent evaporated. The product analyzes 12.7% bromine.

Following the same procedure for the treatment of rosin having one of the double bonds of its abietyl group saturated with hydrogen, a product containing 10.6% bromine will be obtained. Again, following the same procedure for the treatment of methyl abietate, one bond of which is saturated with hydrogen, a product containing 13.8% bromine will be obtained. The products produced in accordance with this invention may, if desired, be refined by washing with alkali, as for example, an aqueous solution of sodium hydroxide, sodium carbonate, ammonia, or the like, for example, a 10% aqueous solution of sodium hydroxide. The alkali wash will remove free chlorine, free hydrogen chloride, and any unstable combined hydrogen chloride.

It will be understood that the method in accordance with this invention, from the broad standpoint, involves catalytic treatment of a partially or completely halogenated compound containing an abietyl group, it being understood that the unsaturation of the abietyl group of the compound may be reduced by hydrogen. It will be further understood that the method in accordance with this invention involves various details of procedure as described. It will be understood that the product in accordance with this invention comprises a compound containing an abietyl group, the unsaturation of which is reduced by the addition of a halogen and which may or may not also be reduced by hydrogen, the product being characterized by substantially complete stability to moderate heat or resistance to loss of halogen acid.

What I claim and desire to protect by Letters Patent is:

1. The method of halogenating a compound containing an abietyl group, which includes halogenating a compound containing an abietyl group and subjecting the halogenated compound to the action of a halogenation catalyst.

2. The method of halogenating a compound containing an abietyl group the unsaturation of which has been reduced by hydrogen, which includes halogenating the compound and subjecting the halogenated compound to the action of a halogenation catalyst.

3. The method of halogenating a compound containing an abietyl group, which includes treating the compound with a halogen and after substantial halogenation of the compound has been accomplished, subjecting the compound to the action of a halogenation catalyst while continuing the halogenation.

4. The method of halogenating a compound containing an abietyl group the unsaturation of which has been reduced by hydrogen, which includes treating the compound with a halogen and after substantial halogenation of the compound has been accomplished, subjecting the compound to the action of a halogenation catalyst while continuing the halogenation.

5. The method of halogenating abietic acid which includes halogenating abietic acid in solution in a solvent inert to the halogen and heating the halogenated product in the presence of a metal halide.

6. The method of halogenating an abietyl alcohol which includes halogenating abietyl alcohol in solution in a solvent inert to the halogen and heating the halogenated product in the presence of a metal halide.

7. The method of halogenating an ester containing an abietyl group, which includes halogenating the ester and heating the halogenated product in the presence of a metal halide.

8. The method of halogenating a compound containing an abietyl group, which includes treating the compound with a halogen in the presence of a metal capable of reacting with halogen halide formed for the production of a metal halide and heating the halogenated compound in the presence of the metal halide formed.

9. The method of halogenating a compound containing an abietyl group, which includes treating the compound with a halogen in the presence of a metal capable of reacting with halogen halide formed for the production of a metal halide and heating the halogenated compound in the presence of the metal halide formed while continuing treatment with a halogen.

10. A compound containing an abietyl group the unsaturation of which has been reduced by the addition of a halogen to a double bond thereof and which is characterized by the fact that it will not give off any substantial amount of hydrogen halide on standing.

11. A compound containing an abietyl group the unsaturation of which has been reduced by the addition of a halogen and hydrogen to different double bonds thereof, respectively, and which is characterized by the fact that it will not give off any substantial amount of hydrogen halide on standing.

12. A compound containing an abietyl group the unsaturation of which has been reduced by the addition of a halogen to a double bond thereof and which is characterized by its production by treatment of a halogenated compound containing an abietyl group in the presence of a halogenation catalyst.

13. The method of halogenating a compound containing an abietyl group, which includes halogenating a compound containing an abietyl group in the presence of a metal halide.

14. The method of halogenating a compound containing an abietyl group, the unsaturation of which has been reduced by hydrogen, which includes treating the compound with a halogen in the presence of a metal halide.

15. The method of halogenating an abietyl alcohol which includes treating abietyl alcohol with a halogen in the presence of a metal halide.

16. The method of halogenating abietic acid which includes treating abietic acid with a halogen in the presence of a metal halide.

17. The method of halogenating an ester containing an abietyl group which includes treating the ester with a halogen in the presence of a metal halide.

18. The method of halogenating a compound containing an abietyl group which includes treating the compound with a halogen and, after substantial halogenation of the compound has been accomplished, heating the halogenated compound in the presence of a metal halide.

19. The method of halogenating a compound containing an abietyl group, the unsaturation of which has been reduced by hydrogen, which includes treating the compound with a halogen and, after substantial halogenation of the compound has been accomplished, heating the halogenated compound in the presence of a metal halide.

20. The method of halogenating a compound containing an abietyl group which includes treating the compound with a halogen and, after substantial halogenation of the compound has been accomplished, heating the halogenated compound in the presence of a halogenation catalyst.

21. The method of halogenating a compound containing an abietyl group, the unsaturation of which has been reduced by hydrogen, which includes treating the compound with a halogen and, after substantial halogenation of the compound has been accomplished, heating the halogenated compound in the presence of a halogenation catalyst.

22. The method of halogenating a compound containing an abietyl group, which includes halogenating a compound containing an abietyl group in solution in a solvent therefor and subjecting the halogenated compound to the action of a halogenation catalyst.

23. The method of halogenating a compound containing an abietyl group, which includes halogenating a compound containing an abietyl group the unsaturation of which has been reduced by hydrogen in solution in a solvent therefor and subjecting the halogenated compound to the action of a halogenation catalyst.

24. The method of halogenating an ester containing an abietyl group, which includes halogenating the ester in solution in a solvent inert to the halogen and heating the halogenated product in the presence of a metallic halide.

JOSEPH N. BORGLIN.